(12) United States Patent
Yoda et al.

(10) Patent No.: US 11,554,594 B2
(45) Date of Patent: Jan. 17, 2023

(54) INK JET METHOD AND INK JET RECORDING APPARATUS

(71) Applicant: Seiko Epson Corporation, Tokyo (JP)

(72) Inventors: Toshiyuki Yoda, Matsumoto (JP); Midori Sekine, Matsumoto (JP); Yuko Hishida, Matsumoto (JP); Kyohei Tanaka, Matsumoto (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/388,155

(22) Filed: Jul. 29, 2021

(65) Prior Publication Data

US 2022/0032660 A1 Feb. 3, 2022

(30) Foreign Application Priority Data

Jul. 30, 2020 (JP) .............................. JP2020-129073

(51) Int. Cl.
*B41J 11/00* (2006.01)
*C09D 11/30* (2014.01)

(52) U.S. Cl.
CPC ...... *B41J 11/00214* (2021.01); *B41J 11/0024* (2021.01); *C09D 11/30* (2013.01)

(58) Field of Classification Search
CPC .............. B41J 11/00214; B41J 11/0024; B41J 29/377; B41J 2/01; B41J 11/0021; C09D 11/30; C09D 11/101; C09D 11/40; B41M 5/0011; B41M 7/0081
See application file for complete search history.

(56) References Cited

U.S. PATENT DOCUMENTS

| | | |
|---|---|---|
| 8,673,431 B2 | 3/2014 | Mochizuki et al. |
| 2013/0065027 A1* | 3/2013 | Mochizuki ............. C09D 11/40 347/100 |

FOREIGN PATENT DOCUMENTS

JP 2013-067770 A 4/2013

* cited by examiner

*Primary Examiner* — Bradley W Thies
(74) *Attorney, Agent, or Firm* — Harness, Dickey & Pierce, P.L.C.

(57) ABSTRACT

An ink jet method records a radiation-curable ink composition containing a polymerizable compound. The radiation-curable ink composition includes a first ink composition and a second ink composition. The ink jet method includes a first discharging step of discharging the first ink composition with an ink jet head to adhere the composition to a recording medium, a first curing step of irradiating the first ink composition adhered to the recording medium with radioactive rays, a cooling step of cooling the recording medium, a second discharging step of discharging the second ink composition with the ink jet head to adhere the composition to the cooled recording medium at least in a part of the region where the first ink composition adhered; and a second curing step of irradiating the second ink composition adhered to the recording medium with radioactive rays.

9 Claims, 2 Drawing Sheets

INK JET METHOD AND INK JET RECORDING APPARATUS

The present application is based on, and claims priority from JP Application Serial Number 2020-129073, filed Jul. 30, 2020, the disclosure of which is hereby incorporated by reference herein in its entirety.

BACKGROUND

1. Technical Field

The present disclosure relates to an ink jet method and an ink jet recording apparatus.

2. Related Art

As described in JP-A-2013-67770, an ink set for forming a multilayer of ultraviolet curable ink jet ink containing a coloring ink composition and a clear ink composition has been known.

However, when recording is performed using the ink set of JP-A-2013-67770, the coating film formed from the clear ink is difficult to obtain glossiness in some cases. In particular, when a coating film of the clear ink is formed on a coating film of the color ink, the glossiness is reduced in some cases. A reduction in glossiness has a risk of not obtaining a sufficient quality of appearance when the ink set is used in printed matter such as signage.

SUMMARY

The ink jet method of the present disclosure is an ink jet method that records a radiation-curable ink composition containing a polymerizable compound, wherein the radiation-curable ink composition includes a first ink composition and a second ink composition; and the ink jet method includes a first discharging step of discharging the first ink composition with an ink jet head to adhere the composition to a recording medium, a curing step of irradiating the first ink composition adhered to the recording medium with radioactive rays, a cooling step of cooling the recording medium, a second discharging step of discharging the second ink composition with an ink jet head to adhere the composition to the cooled recording medium at least in a part of the region where the first ink composition adhered, and a second curing step of irradiation the second ink composition adhered to the recording medium with radioactive rays.

An ink jet recording apparatus includes the ink jet head and a radiation source and performs recording by the ink jet method.

DESCRIPTION OF EXEMPLARY EMBODIMENTS

1. Radiation-Curable Ink Composition

Figure 1:
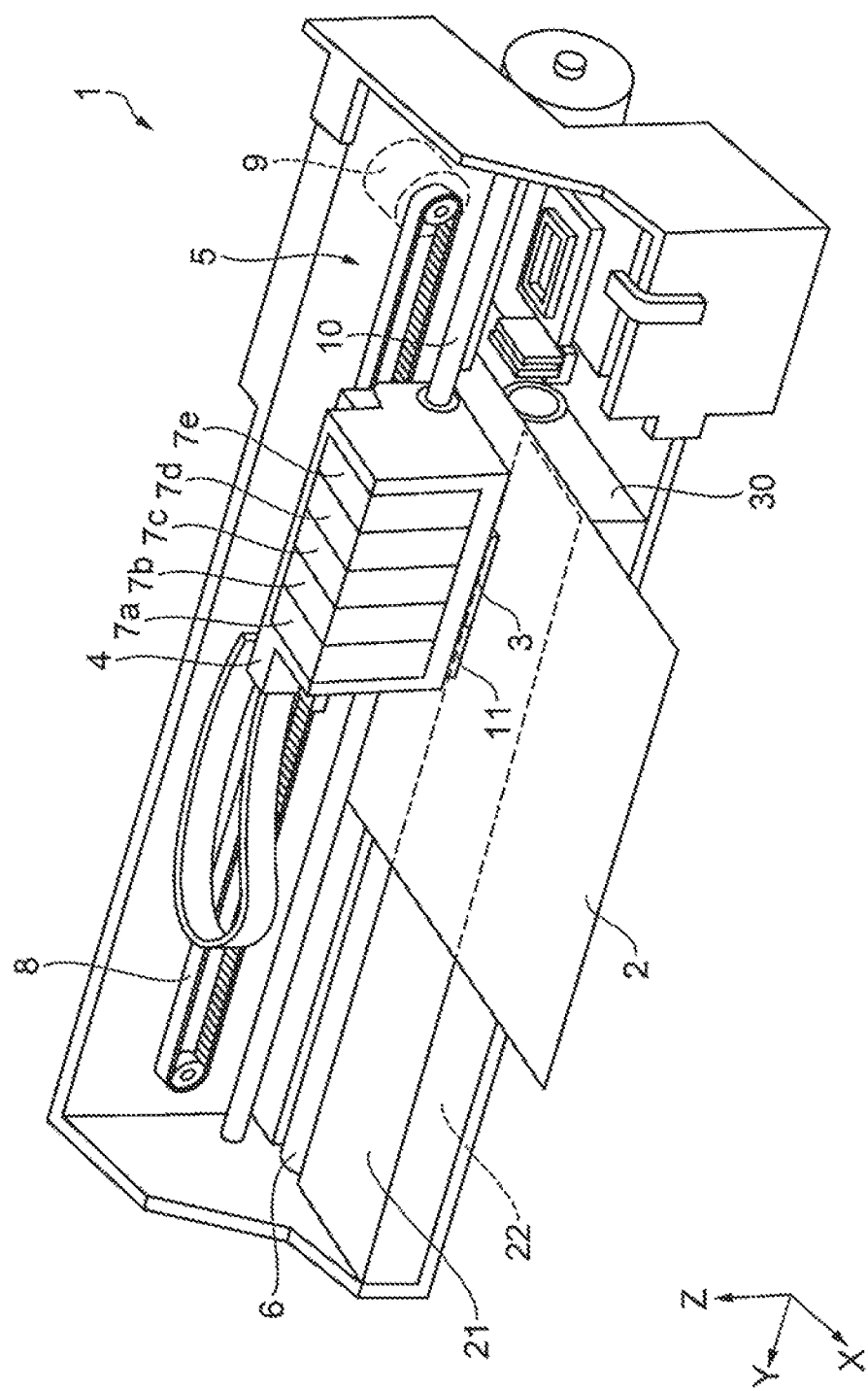
FIG. 1 is a schematic perspective view illustrating the structure of an ink jet recording apparatus according to an embodiment.

The ink jet method according to the present embodiment is used for forming an image, a color, a character, a pattern, etc. on a recording medium by allowing the first ink composition and the second ink composition to adhere in layers onto a recording medium. The first ink composition and the second ink composition of the present embodiment are both radiation-curable ink compositions each containing a polymerizable compound.

A radiation-curable ink composition is an ink that is cured by irradiation with radioactive rays. Examples of the radioactive rays include ultraviolet rays, electron rays, infrared rays, visible light rays, and X-rays. Among these radioactive rays, ultraviolet rays may be used as the radioactive rays because a radiation source is easily available and widely used and because a material suitable for being cured by the peak wavelength of radioactive rays is easily available and widely used.

1.1. First Ink Composition

The first ink composition of the present embodiment includes a polymerizable compound and a photopolymerization initiator. The first ink composition may or may not include a color material, but when it is used for coloring a recording medium or forming an image, etc. on a recording medium, the first ink composition may be a color ink containing a color material. The components contained in the first ink composition will now be described.

1.1.1. Polymerizable Compound

Examples of the polymerizable compound include a monofunctional monomer having one polymerizable functional group, a multifunctional monomer having a plurality of polymerizable functional groups, and an oligomer having one or more polymerizable functional groups. These compounds may be used alone or in combination of two or more thereof. Although examples of the polymerizable compound are shown below, the polymerizable compound in the present embodiment is not limited to them.

The polymerizable functional group possessed by the polymerizable compound of the present embodiment is not particularly limited as long as a polymerization reaction by radioactive rays is possible, and known polymerizable functional groups can be used. In particular, the polymerizable functional group may be a polymerizable functional group having an unsaturated double bond between carbon atoms, a methacryloyl group, or an acryloyl group from the viewpoint of polymerization reactivity.

Incidentally, in the present specification, the term "(meth)acryloyl" means at least one of acryloyl and methacryloyl corresponding to the acryloyl, the term "(meth)acrylate" means at least one of acrylate and methacrylate corresponding to the acrylate, and the term "(meth)acryl" means at least one of acryl and methacryl corresponding to the acryl.

1.1.1.1. Monofunctional Monomer

Examples of the monofunctional monomer include a nitrogen-containing monofunctional monomer, a monofunctional (meth)acrylate having a crosslinked condensed ring structure, a monofunctional (meth)acrylate having an aromatic group, a monofunctional (meth)acrylate having an alicyclic structure, a monofunctional (meth)acrylate having a cyclic ether structure, other monofunctional (meth)acrylates, and other monofunctional monomers. In addition, as needed, a monofunctional monomer other than the above-mentioned monofunctional monomers may be used instead of or in addition to the above-mentioned monofunctional monomer.

The lower limit of the content of the monofunctional monomer contained in the first ink composition may be 80 mass % or more, 85 mass % or more, or 90 mass % or more based on the total amount of the polymerizable compounds contained in the first ink composition. According to this, the extensibility of the cured coating film of the first ink composition is improved. In addition, when the content of the monofunctional monomer is 80 mass % or more, since the glossiness tends to decrease in known ink compositions, the present disclosure is particularly effective.

The upper limit of the content of the monofunctional monomer contained in the first ink composition may be 99 mass % or less, 97 mass % or less, or 95 mass % or less based on the total amount of the polymerizable compounds contained in the first ink composition. According to this, the curability of the first ink composition is improved.

Examples of the nitrogen-containing monofunctional monomer include nitrogen-containing monofunctional vinyl monomers, such as N-vinylcaprolactam, N-vinylformamide, N-vinylcarbazole, N-vinylacetamide, N-vinylpyrrolidone, and vinyl methyl oxazolidinone; nitrogen-containing monofunctional acrylate monomers, such as acryloylmorpholine; and nitrogen-containing monofunctional acrylamide monomers, such as (meth)acrylamide, N-hydroxymethyl(meth)acrylamide, diacetone acrylamide, N,N-dimethyl(meth)acrylamide, and (meth)acrylamides such as a dimethylaminoethylacrylate benzyl chloride quaternary salt.

Among these monomers, the nitrogen-containing monofunctional monomer may be a nitrogen-containing monofunctional vinyl monomer or a nitrogen-containing monofunctional acrylate monomer, or may be a monomer having a nitrogen-containing heterocyclic structure, such as N-vinylcaprolactam, N-vinylcarbazole, N-vinylpyrrolidone, vinyl methyl oxazolidinone, or acryloylmorpholine, or may be acryloylmorpholine.

The scratch resistance of the cured coating film of the first ink composition is improved by using such a nitrogen-containing monofunctional monomer. Furthermore, a nitrogen-containing monofunctional acrylate monomer having a nitrogen-containing heterocyclic structure, such as acryloylmorpholine, enhances the extensibility and the adhesion to the recording medium. Incidentally, in the following explanation, the adhesion to a recording medium or to a cured coating film of another ink may be simply referred to as adhesion.

In a monofunctional (meth)acrylate having a crosslinked condensed ring structure, the crosslinked condensed ring structure is a structure in which two or more ring structures share a side in a one-to-one manner, and two or more non-adjacent atoms in a single ring structure or different ring structures are connected to each other. Examples of the monofunctional (meth)acrylate having a crosslinked condensed ring structure include dicyclopentenyl (meth)acrylate, dicyclopentenyloxyethyl (meth)acrylate, and dicyclopentanyl (meth)acrylate. In addition, a monofunctional (meth)acrylate having a crosslinked condensed ring structure of the following formula (a) or (b) may be used.

[Chem. 1]

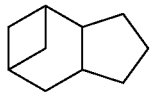

(a)

[Chem. 2]

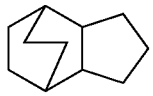

(b)

When the above-mentioned monofunctional (meth)acrylate having a crosslinked condensed ring structure is used, the scratch resistance, extensibility, and adhesion of the cured coating film of the ink composition are further improved.

The monofunctional (meth)acrylate having an aromatic group is not particularly limited, and examples thereof include phenoxyethyl (meth)acrylate, benzyl (meth)acrylate, alkoxylated 2-phenoxyethyl (meth)acrylate, ethoxylated nonylphenyl (meth)acrylate, alkoxylated nonylphenyl (meth)acrylate, p-cumylphenol EO-modified (meth)acrylate, and 2-hydroxy-3-phenoxypropyl (meth)acrylate.

When the above-mentioned (meth)acrylate having an aromatic group is used, the solubility of a photopolymerization initiator is improved, and the curability of the ink composition is improved. In particular, the (meth)acrylate having an aromatic group may be used when an acylphosphine oxide-based photopolymerization initiator or a thioxanthone-based photopolymerization initiator is used as a photopolymerization initiator described later.

Examples of the monofunctional (meth)acrylate having an alicyclic structure include isobornyl (meth)acrylate, tert-butylcyclohexanol acrylate, 2-(meth)acrylic acid-1,4-dioxaspiro[4,5]dec-2-ylmethyl, and dicyclopentanyl acrylate.

Examples of the monofunctional (meth)acrylate having a cyclic ether structure include cyclic trimethylolpropane formal acrylate, tetrahydrofurfuryl acrylate, and (2-methyl-2-ethyl-1,3-dioxolan-4-yl)methyl acrylate.

Examples of other monofunctional (meth)acrylate include (meth)acrylates having aliphatic groups containing linear or branched chains, such as 2-ethylhexyl (meth)acrylate, isoamyl (meth)acrylate, stearyl (meth)acrylate, lauryl (meth)acrylate, octyl (meth)acrylate, decyl (meth)acrylate, isodecyl (meth)acrylate, isomyristyl (meth)acrylate, isostearyl (meth)acrylate, 2-hydroxyethyl (meth)acrylate, 2-hydroxypropyl (meth)acrylate, 2-hydroxybutyl (meth)acrylate, butoxyethyl (meth)acrylate, and tetrahydrofurfuryl (meth)acrylate; and lactone-modified flexible (meth)acrylates.

1.1.1.2. Multifunctional Monomer

Examples of the multifunctional monomer include vinyl ether group-containing (meth)acrylates and multifunctional (meth)acrylates.

When the multifunctional monomer is added, the content thereof may be 0.01 mass % or more and 15.00 mass % or less, 0.50 mass % or more and 15.00 mass % or less, or 1.00 mass % or more and 15.00 mass % or less based on the total amount of the clear ink. When the content of the multifunctional monomer is 0.01 mass % or more, the curability of the clear ink and the scratch resistance of the cured coating film are improved. In addition, when the content of the multifunctional monomer is 15.00 mass % or less, the extensibility and adhesion of the cured coating film of the clear ink tend to be further improved.

Examples of the vinyl ether group-containing (meth)acrylate include monomers represented by the following formula (I). The monomer represented by the formula (I) includes one (meth)acryloyl group as a functional group and another functional group that has an unsaturated double bond between carbon atoms, such as a vinyl ether group. When such a vinyl ether group-containing (meth)acrylate is contained, the viscosity of the ink composition decreases, and the discharge stability is improved. In addition, the curability of the ink composition is improved, and the recording speed on a recording medium can be increased with the improvement in the curability.

$$H_2C=CR^1-CO-OR^2-O-CH=CH-R^3 \quad (I)$$

(where, $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms).

In the formula (I), examples of the divalent organic residue having 2 to 20 carbon atoms represented by $R^2$ include an optionally substituted linear, branched, or cyclic alkylene group having 2 to 20 carbon atoms, an optionally substituted alkylene group having 2 to 20 carbon atoms and having at least one of an ether bond and an ester bond in the structure, and an optionally substituted divalent aromatic group having 6 to 11 carbon atoms.

Among these examples, the organic residue may be an alkylene group having 2 to 6 carbon atoms, such as an ethylene group, an n-propylene group, an isopropylene group, and a butylene group; or an alkylene group having 2 to 9 carbon atoms and an oxygen atom of an ether bond in the structure, such as an oxyethylene group, an oxy-n-propylene group, an oxyisopropylene group, and an oxybutylene group. Furthermore, from the viewpoint of reducing the viscosity of the ink and improving the curability of the ink, $R^2$ may be a compound having a glycol ether chain that is an alkylene group having 2 to 9 carbon atoms and an oxygen atom of an ether bond in the structure, such as an oxyethylene group, an oxy-n-propylene group, an oxyisopropylene group, and an oxybutylene group.

In the formula (I), the monovalent organic residue having 1 to 11 carbon atoms represented by $R^3$ may be an optionally substituted linear, branched, or cyclic alkyl group having 1 to 10 carbon atoms or an optionally substituted aromatic group having 6 to 11 carbon atoms. Among these examples, the monovalent organic residue may be an alkyl group having one or two carbon atoms, i.e., a methyl group or an ethyl group, or an aromatic group having 6 to 8 carbon atoms, such as a phenyl group and a benzyl group.

When the above-mentioned organic residues are optionally substituted groups, the substituents are divided into groups containing carbon atoms and groups not containing carbon atoms. When the substituent is a group containing a carbon atom, the carbon atom is counted as the carbon atom of the organic residue. Examples of the group containing a carbon atom include a carboxyl group and an alkoxy group. Examples of the group not containing a carbon atom include a hydroxy group and a halo group.

Examples of the monomer represented by the formula (I) include 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylatel, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(2-vinyloxyethoxy)ethyl (meth)acrylate, 2-(vinyloxyisopropoxy)ethyl (meth)acrylate, 2-(vinyloxyethoxy) propyl (meth)acrylate, 2-(vinyloxyethoxy) isopropyl (meth)acrylate, 2-(vinyloxyisopropoxy) propyl (meth)acrylate, 2-(vinyloxyisopropoxy) isopropyl (meth)acrylate, 2-(vinyloxyethoxyethyl)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy) propyl (meth)acrylate, 2-(vinyloxyethoxyisopropoxy) propyl (meth)acrylate, 2-(vinyloxyisopropoxyethoxy) propyl (meth)acrylate, 2-(vinyloxyisopropoxyisopropoxy)propyl (meth)acrylate, 2-(vinyloxyethoxyethoxy) isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth)acrylate, polyethylene glycol monovinyl ether (meth)acrylate, and polypropylene glycol monovinyl ether (meth)acrylate. Among these examples, in particular, the monomer may be 2-(2-vinyloxyethoxy)ethyl acrylate because of the ease of balancing the curability and the viscosity of the ink composition.

The monomers represented by the formula (I) have relatively low viscosities compared to general monofunctional monomers and contribute to a reduction in the viscosity of the clear ink. In addition, the monomers are also excellent in curability by irradiation with radioactive rays. Consequently, it is possible to reduce the viscosity of the ink composition and also to improve the curability when forming a cured coating film.

Examples of the multifunctional (meth)acrylate include difunctional (meth)acrylates, such as diethylene glycol di(meth)acrylate, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, propoxylated (2) neopentyl glycol di(meth)acrylate, dimethylol-tricyclodecane di(meth)acrylate, bisphenol A EO (ethylene oxide) adduct di(meth)acrylate, bisphenol A PO (propylene oxide) adduct di(meth)acrylate, hydroxypivalic acid neopentyl glycol di(meth)acrylate, and polytetramethylene glycol di(meth)acrylate; and tri- or higher multifunctional (meth)acrylates, such as trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerin propoxy tri(meth)acrylate, caprolactone-modified trimethylolpropane tri(meth)acrylate, pentaerythritolethoxy tetra(meth)acrylate, and caprolactam-modified dipentaerythritol hexa(meth)acrylate. Among these examples, in particular, dipropylene glycol di(meth)acrylate may be used because of the ease of balancing the curability and the viscosity of the ink composition.

1.1.1.3. Oligomer

An oligomer is a multimer of which the constituent is a polymerizable compound and is a compound having one or more functional groups. Incidentally, the polymerizable compound mentioned here is not limited to the above-mentioned polymerizable compounds. In the present specification, a polymerizable compound having a molecular weight of 1000 or less is referred to as a monomer, and a polymerizable compound having a molecular weight of higher than 1000 is referred to as an oligomer.

Examples of the oligomer include a urethane acrylate oligomer having a repeating structure of urethane, a polyester acrylate oligomer having a repeating structure of ester, and an epoxy acrylate oligomer derived from a polymerizable compound having a repeating structure of epoxy.

Among these examples, the oligomer may be a urethane acrylate oligomer. The urethane acrylate oligomer may be an aromatic urethane acrylate oligomer or an aliphatic urethane acrylate oligomer. In addition, the number of the functional groups possessed by the urethane acrylate oligomer may be four or less or two or less. According to this, the viscosity of the first ink composition is prevented from increasing, and also the curability of the first ink composition and the adhesion of the cured coating film are improved.

When the oligomer is added, the content thereof may be 1 mass % or more and 15 mass % or less, 1 mass % or more and 10 mass % or less, or 2 mass % or more and 7 mass % or less based on the total amount of the polymerizable compositions contained in the first ink composition. According to this, the viscosity of the first ink composition is prevented from increasing, and also the curability of the first ink composition and the adhesion of the cured coating film are further improved.

When the oligomer is added, the content thereof may be 1 mass % or more and 15 mass % or less, 1 mass % or more and 10 mass % or less, or 2 mass % or more and 7 mass % or less based on the total amount of the first ink composition. The viscosity of the ink composition is prevented from increasing, and also the curability of the first ink composition and the adhesion of the cured coating film are further improved.

1.1.2. Photopolymerization Initiator

The photopolymerization initiator generates an active species by irradiation with radioactive rays and promotes the polymerization of a polymerizable compound by the active species. The active species that is generated from the photopolymerization initiator is specifically, for example, a radical, an acid, or a base.

Examples of the photopolymerization initiator include known photopolymerization initiators, such as an acylphosphine oxide-based photopolymerization initiator, an alkylphenone-based photopolymerization initiator, a titanocene-based photopolymerization initiator, and a thioxanthone-based photopolymerization initiator. Among these examples, the photopolymerization initiator may be a thioxanthone-based photopolymerization initiator or an acylphosphine oxide-based photopolymerization initiator. According to this, the curability of the first ink composition, in particular, the curability in the curing process using light from a UV-LED (ultraviolet light emission diode) is improved. The photopolymerization initiators may be used alone or in combination of two or more thereof.

Examples of the acylphosphine oxide-based photopolymerization initiator include 2,4,6-trimethylbenzoyl diphenylphosphine oxide, bis(2,4,6-trimethylbenzoyl)-phenylphosphine oxide, and bis(2,6-dimethoxybenzoyl)-2,4,4-trimethylpentylphosphine oxide.

As the acylphosphine oxide-based photopolymerization initiator, a commercial product may be used. Examples of the commercial product include products of BASF SE, such as IRGACURE (registered trademark) 819 (bis(2,4,6-trimethylbenzoyl)-phenylphosphine oxide) and IRGACURE TPO (2,4,6-trimethylbenzoyl diphenylphosphine oxide); products of IGM Resins B.V., such as Omnirad 1800 (a mixture of bis(2,6-dimethoxybenzoyl)-2,4,4-trimethylpentylphosphine oxide and 1-hydroxy-cyclohexyl-phenylketone at a mass ratio of 25:75); and products of Lambson Group Ltd., such as Speedcure (registered trademark) TPO (2,4,6-trimethylbenzoyl diphenylphosphine oxide).

The content of the acylphosphine oxide-based photopolymerization initiator added to the first ink composition may be 3 mass % or more and 15 mass % or less, 5 mass % or more and 12 mass % or less, or 7 mass % or more and 10 mass % or less based on the total amount of the first ink composition. According to this, the curability is improved, and the solubility of the photopolymerization initiator is also secured.

Examples of the thioxanthone-based photopolymerization initiator include thioxanthone, 2-methylthioxanthone, 2,4-diethylthioxanthone, 2-isopropylthioxanthone, 4-isopropylthioxanthone, and 2-chlorothioxanthone.

As the thioxanthone-based photopolymerization initiator, a commercial product may be used. Examples of the commercial product include products of Lambson Group Ltd., such as Speedcure (registered trademark) DETX (2,4-diethylthioxanthone).

When the thioxanthone-based photopolymerization initiator is added, the content thereof may be 0.5 mass % or more and 10 mass % or less or 1 mass % or more and 7 mass % or less based on the total amount of the first ink composition. According to this, the curability is further improved.

1.1.3. Color Material

The first ink composition may contain a color material or may not, but may be a color ink containing a color material. According to this, it is possible to color a recording medium or to form a color image on a recording medium. As the color material, a pigment or a dye is used.

The pigment improves the light resistance of the color material in the cured coating film of the first ink composition. The pigment may be an inorganic pigment or an organic pigment.

The pigment may be a known inorganic pigment or a known organic pigment. Examples of the organic pigment include azo pigments, such as an azo lake pigment, an insoluble azo pigment, a condensed azo pigment, and a chelate azo pigment; polycyclic pigments, such as a phthalocyanine pigment, a perylene pigment, a perinone pigment, an anthraquinone pigment, a quinacridone pigment, a dioxazine pigments, a thioindigo pigment, an isoindolinone pigment, an isoindoline pigment, a quinophthalone pigment, and a diketo-pyrrolo-pyrrole pigment; dye lake pigments, such as a basic dye type lake and an acid dye type lake; nitro pigments; nitroso pigments; aniline black; and daylight fluorescent pigments. Examples of the inorganic pigment include metal oxide pigments, such as titanium dioxide, zinc oxide, and chromium oxide; and carbon black. In addition, a glitter pigment, such as a pearl pigment or a metallic pigment, may be used.

As a black pigment, C.I. (Colour Index Generic Name) Pigment Black 1, 7, and 11 are mentioned. Among these black pigments, carbon black that is C.I. Pigment Black 7 may be used.

Specifically, examples of the carbon black include those manufactured by Mitsubishi Chemical Corporation, such as No. 2300, No. 900, MCF88, No. 33, No. 40, No. 45, No. 52, MA7, MA8, MA100, and No. 2200B; those manufactured by Columbian Carbon Co., such as Raven (registered trademark) series 5750, 5250, 5000, 3500, 1255, and 700; those manufactured by Cabot Corp., such as Regal (registered trademark) series 400R, 330R, and 660R, Mogul (registered trademark) L, and Monarch (registered trademark) series 700, 800, 880, 900, 1000, 1100, 1300, and 1400; and those manufactured by Degussa-Huls AG, such as Color Black series FW1, FW2, FW2V, FW18, FW200, S150, S160, and S170, Printex (registered trademark) series 35, U, V, and 140U, and SpecialBlack series 6, 5, 4A, and 4.

Examples of white pigments include C.I. Pigment White 6, 18, and 21.

Examples of yellow pigments include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, and 180.

Examples of magenta pigments include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245 and C.I. Pigment Violet 19, 23, 32, 33, 36, 38, 43, and 50.

Examples of cyan pigments include C.I. Pigment Blue 1, 2, 3, 15, 15:1, 15:2, 15:3, 15:34, 15:4, 16, 18, 22, 25, 60, 65, and 66 and C.I. Vat Blue 4 and 60.

Examples of color pigments other than those mentioned above include C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

The pigments may be used alone or in combination of two or more thereof. When a pigment is used, a dispersant described later may be used in combination. The pigment may have an average particle diameter of 300 nm or less or 50 nm or more and 200 nm or less. When the average particle diameter of the pigment is within the above-mentioned range, the discharge property and the dispersion stability of the first ink composition and the image quality of an image or the like in a cured coating film of the first ink composition are improved. Incidentally, the average particle diameter mentioned here indicates the volume-based particle size distribution (50%) measured by a dynamic light scattering method.

When the pigment is added to the first ink composition, the content thereof may be 0.2 mass % or more and 20.0 mass % or less, 1.0 mass % or more and 20.0 mass % or less, 1.0 mass % or more and 15.0 mass % or less, or 1.0 mass % or more and 10.0 mass % or less based on the total amount of the first ink composition. According to this, the color developing property in a cured coating film of the first ink composition and the discharge property of the first ink composition from an ink jet head are improved.

As the dye, a known acid dye, direct dye, reactive dye, or basic dye can be used. Examples of the dye include C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Black 1, 2, 15, 71, 86, 87, 98, 165, 199, and 202, C.I. Direct Blue 19, 38, 51, 71, 154, 168, 171, and 195, C.I. Reactive Red 14, 32, 55, 79, and 249, and C.I. Reactive Black 3, 4, and 35. The dyes may be used alone or in combination of two or more thereof.

When the dye is added, the content thereof may be 0.2 mass % or more and 20.0 mass % or less, 1.0 mass % or more and 20.0 mass % or less, 1.0 mass % or more and 15.0 mass % or less, or 1.0 mass % or more and 10.0 mass % or less based on the total amount of the first ink composition.

1.1.4. Other Component

The first ink composition may further contain other additives, such as a dispersant, a polymerization inhibitor, a slipping agent, and a photosensitizer, as needed.

Examples of the dispersant include known dispersants that are commonly used for preparing pigment dispersions, such as a polymer dispersant. Specifically, examples of the dispersant include dispersants whose main component is at least one selected from the group consisting of polyoxyalkylene polyalkylene polyamines, vinyl polymers and copolymers, acrylic polymers and copolymers, polyesters, polyamides, polyimides, polyurethanes, amino polymers, silicon-containing polymers, sulfur-containing polymers, fluorine-containing polymers, and epoxy resins. The dispersants may be used alone or in combination of two or more thereof.

As the polymer dispersant, a commercial product may be used. Examples of the commercial product include AJISPER (registered trademark) series of Ajinomoto Fine-Techno Co., Ltd., Solsperse (registered trademark) series of The Lubrizol Corporation, such as Solsperse 36000, DISPERBYK series of BYK Additives & Instruments, and DISPARLON (registered trademark) series of Kusumoto Chemicals, Ltd.

When the dispersant is added, the content thereof may be 0.05 mass % or more and 1.00 mass % or less or 0.10 mass % or more and 0.50 mass % or less based on the total amount of the first ink composition. According to this, the storage stability and discharge stability of the first ink composition are improved.

The polymerization inhibitor suppresses the progress of the unintended polymerization reaction of a polymerizable compound, for example, during storage to improve the storage stability of the first ink composition. The polymerization inhibitors may be used alone or in combination of two or more thereof.

The polymerization inhibitor is not particularly limited, and examples thereof include 4-methoxyphenol (hydroquinone monomethyl ether), 4-hydroxy-2,2,6,6-tetramethylpiperidine-N-oxyl, hydroquinone, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), and 4,4'-thiobis(3-methyl-6-t-butylphenol), a hindered amine compound, 2,2,6,6-tetramethylpiperidinyl-1-oxyl, and a derivative of 2,2,6,6-tetramethylpiperidinyl-1-oxyl.

Among the above-mentioned polymerization inhibitors, 2,2,6,6-tetramethylpiperidinyl-1-oxyl or a derivative thereof may be used. The derivative of 2,2,6,6-tetramethylpiperidinyl-1-oxyl is not particularly limited, and examples thereof include 4-acetamide-2,2,6,6-tetramethylpiperidinyl-1-oxyl, 4-amino-2,2,6,6-tetramethylpiperidinyl-1-oxyl, 4-carboxy-2,2,6,6-tetramethylpiperidinyl-1-oxyl, 4-(2-chloroacetamide)-2,2,6,6-tetramethylpiperidinyl-1-oxyl, 4-cyano-2,2,6,6-tetramethylpiperidinyl-1-oxyl, 4-hydroxy-2,2,6,6-tetramethylpiperidinyl-1-oxyl, 4-hydroxybenzoate-2,2,6,6-tetramethylpiperidinyl-1-oxyl, 4-(2-iodoacetamide)-2,2,6,6-tetramethylpiperidinyl-1-oxyl, 4-isothiocyanate-2,2,6,6-tetramethylpiperidinyl-1-oxyl, 4-methacryloyloxy-2,2,6,6-tetramethylpiperidinyl-1-oxyl, 4-methoxy-2,2,6,6-tetramethylpiperidinyl-1-oxyl, 4-oxo-2,2,6,6-tetramethylpiperidinyl-1-oxyl, and 4-(2-propinyloxy)-2,2,6,6-tetramethylpiperidinyl-1-oxyl.

When the polymerization inhibitor is added, the content thereof may be 0.05 mass % or more and 1.00 mass % or less or 0.05 mass % or more and 0.50 mass % or less based on the total amount of the first ink composition.

The slipping agent improves the scratch resistance of a cured coating film of the first ink composition. Examples of the slipping agent include an acetylene glycol-based surfactant, a fluorine-based surfactant, and a silicone-based surfactant. Among these examples, a silicone-based surfactant, such as polyester-modified silicone or polyether-modified silicone, may be used. As such a surfactant, a commercial product may be used, and examples thereof include products of BYK Additives & Instruments, for example, polyester-modified silicone such as BYK (registered trademark) series 347 and 348, BYK-UV series 3500, 3510, and 3530, and polyether-modified silicone such as BYK-3570. These slipping agents may be used alone or in combination of two or more thereof.

When the slipping agent is added, the content thereof may be 0.1 mass % or more and 1.0 mass % or less or 0.2 mass % or more and 0.8 mass % or less based on the total amount of the first ink composition.

The photosensitizer absorbs radioactive rays to be transferred to an excited state and promotes the generation of active species from the photopolymerization initiator. Examples of the photosensitizer include amine compounds, such as an aliphatic amine, an amine having an aromatic group, piperidine, a reaction product of an epoxy resin and an amine, and triethanolamine triacrylate; urea compounds, such as allylthiourea and o-tolylthiourea; sulfur compounds, such as sodium diethyl dithiophosphate and a soluble salt of aromatic sulfinic acid; nitrile compounds, such as N,N-diethyl-p-aminobenzonitrile; phosphorus compounds, such as tri-n-butylphosphine and sodium diethyl dithiophosphide; nitrogen compounds, such as Michler's ketone, an N-nitrosohydroxylamine derivative, an oxazolidine compound, a tetrahydro-1,3-oxazine compound, and a condensate of formaldehyde or acetaldehyde with diamine; and chlorine compounds, such as carbon tetrachloride and hexachloroethane. These photosensitizers may be used alone or in combination of two or more thereof.

When the photosensitizer is added, the content thereof may be 0.5 mass % or more and 3.0 mass % or less based on the total amount of the first ink composition.

1.2. Second Ink Composition

The second ink composition of the present embodiment includes a polymerizable compound and a photopolymerization initiator. The second ink composition may contain a color material or may not. When the first ink composition is a color ink containing a color material in a relatively large amount, the second ink composition may be a clear ink. According to this, when the first ink composition is a color ink containing a color material, the printed matter can obtain glossiness while protecting the image formed by a cured coating film of the first ink composition. The components contained in the second ink composition will now be described.

1.2.1. Polymerizable Compound

As the polymerizable compound contained in the second ink composition, the polymerizable compounds that are contained in the first ink composition and other polymerizable compounds are applicable. These polymerizable compounds may be used alone or in combination of two or more thereof.

The weighted average of the glass transition temperatures of homopolymers in the polymerizable compounds may be 48° C. or more when the mass ratios of the contents of the polymerizable compounds contained in the second ink composition are weighted and may be 70° C. or more or 85° C. or more. When the weighted average is 48° C. or more, the scratch resistance of the printed matter can be improved. The upper limit of the weighted average is not particularly limited and may be 140° C. or less, 120° C. or less, or 110° C. or less.

A method for calculating the weighted average will be described. The weighted average value is represented by $Tg_{All}$ (° C.), the glass transition temperature of a homopolymer of a polymerizable compound is represented by $Tg_N$ (° C.), and the mass ratio of the content of the polymerizable compound corresponding to the homopolymer, in other words, the content ratio of each polymerizable compound based on the total amount of the polymerizable compounds, is represented by $X_N$ (mass %), where N is a sequential number starting from 1 according to the types of the polymerizable compounds contained in the second ink composition. Specifically, when three types of polymerizable compounds are used, three glass transition temperatures $Tg_1$, $Tg_2$, and $Tg_3$ are set.

The weighted average $Tg_{All}$ is the sum total of the respective products of the glass transition temperature $Tg_N$ of a homopolymer corresponding to each polymerizable compound and the content ratio $X_N$ of the polymerizable compound. Accordingly, the following mathematical expression (II) is completed:

$$Tg_{All} = \Sigma Tg_N \times X_N \quad \text{(II)}.$$

The weighted average $Tg_{All}$ can be adjusted by the glass transition temperature of each polymerizable compound and the mass ratio of each polymerizable compound. Incidentally, the glass transition temperature of a homopolymer of a polymerizable compound can be obtained from, for example, the safety data sheet (SDS) or catalog information of the polymerizable compound.

1.2.1.1. Monofunctional Monomer

As the monofunctional monomer contained in the second ink composition, the monofunctional monomers that are used in the first ink composition are applicable. In addition, as needed, a monofunctional monomer other than the above-mentioned monofunctional monomers may be used instead of or in addition to the above-mentioned monofunctional monomer. As the monofunctional monomer contained in the second ink composition, a single monofunctional monomer may be used or a combination of two or more thereof may be used.

The total content of monofunctional monomer contained in the second ink composition may be 85 mass % or more or 90 mass % or more based on the total amount of the polymerizable compounds contained in the second ink composition. According to this, the cured coating film has flexibility, and the extensibility can be improved.

In addition, the second ink composition may contain one or more nitrogen-containing monofunctional monomers among the above-mentioned monofunctional monomers. Since a nitrogen-containing monofunctional monomer tends to form a homopolymer having a glass transition temperature, the scratch resistance of a cured coating film of the second ink composition is improved. In particular, a nitrogen-containing monofunctional acrylate monomer having a nitrogen-containing heterocyclic structure, such as acryloylmorpholine, improves the extensibility and the adhesion to a recording medium or a cured coating film of the first ink composition of a cured coating film of the second ink composition.

The total content of the nitrogen-containing monofunctional monomer contained in the second ink composition may be 5 mass % or more or 10 mass % or more based on the total amount of the polymerizable compounds contained in the second ink composition.

1.2.1.2. Multifunctional Monomer

As the polymerizable compound contained in the second ink composition, the multifunctional monomers that are used in the first ink composition are applicable. In addition, as needed, a multifunctional monomer other than the above-mentioned multifunctional monomers may be used instead of or in addition to the above-mentioned multifunctional monomer. As the multifunctional monomer contained in the second ink composition, a single multifunctional monomer may be used or a combination of two or more thereof may be used.

When the multifunctional monomer is added, the content thereof may be 0.01 mass % or more and 20.00 mass % or less, 0.01 mass % or more and 15.00 mass % or less, or 1.00 mass % or more and 15.00 mass % or less based on the total amount of the polymerizable compounds contained in the second ink composition. When the content of the multifunctional monomer is 0.01 mass % or more, the scratch resistance of the printed matter is improved. When the content of the multifunctional monomer is 20.00 mass % or less, the extensibility and adhesion of the cured coating film are improved.

In addition, the second ink composition may contain one or more vinyl ether group-containing (meth)acrylates represented by the formula (I) among the above-mentioned multifunctional monomers, in particular, 2-(2-vinyloxyethoxy)ethyl acrylate. Since the vinyl ether group-containing (meth)acrylates of the formula (I) have relatively good curability, the curability of the second ink composition can be improved. In addition, the second ink composition can have a relatively low viscosity. In particular, the present disclosure includes a cooling step, and thereby the viscosity of the second ink composition in the second discharging step is apt to increase. Accordingly, the vinyl ether group-containing (meth)acrylate of the formula (I) can be suitably used in the second ink composition.

The total content of the vinyl ether group-containing (meth)acrylate represented by the formula (I) contained in the second ink composition may be 5 mass % or more or 10 mass % or more based on the total amount of the polymerizable compounds contained in the second ink composition.

1.2.1.3. Oligomer

As the polymerizable compound contained in the second ink composition, the oligomers that are used in the first ink composition are applicable. In addition, as needed, an oligomer other than the above-mentioned oligomers may be used instead of or in addition to the above-mentioned oligomer. As the oligomer contained in the second ink composition, a single oligomer may be used or a combination of two or more thereof may be used.

When the oligomer is added, the content thereof may be 1 mass % or more and 15 mass % or less, 1 mass % or more and 10 mass % or less, or 2 mass % or more and 7 mass % or less based on the total amount of the second ink composition. According to this, the viscosity of the second ink composition is further prevented from increasing, and also the curability of the second ink composition and the adhesion of the cured coating film are improved.

1.2.2. Photopolymerization Initiator

As the photopolymerization initiator contained in the second ink composition, the photopolymerization initiators that are used in the first ink composition can be used. The content of the photopolymerization initiator in the second ink composition may be 3 mass % or more and 12 mass % or less, 5 mass % or more and 10 mass % or less, or 7 mass % or more and 9 mass % or less based on the total amount of the second ink composition. According to this, the curability of the second ink composition is improved, and the solubility of the photopolymerization initiator is secured.

1.2.3. Color Material

Although the second ink composition may or may not contain a color material, when the first ink composition is a color ink containing a color material, the second ink composition may be a clear ink. According to this, when the first ink composition is a color ink containing a color material, the printed matter can obtain glossiness while protecting the image formed by a cured coating film of the first ink composition. Incidentally, as the color material, the pigment and dye that are used in the first ink composition can be used.

When the second ink composition is a clear ink, the total content of the color material may be 0.2 mass % or less or 0.1 mass % or less based on the total amount of the second ink composition, and the color material may not be contained. According to this, the printed matter can obtain glossiness while protecting the image formed by the first ink composition without changing the appearance.

When the second ink composition is a color ink, the total content of the color material may be 0.2 mass % or more and 20.0 mass % or less, 1.0 mass % or more and 20.0 mass % or less, 1.0 mass % or more and 15.0 mass % or less, or 1.0 mass % or more and 10.0 mass % or less based on the total amount of the second ink composition.

1.3. Preparation Method

The first ink composition and the second ink composition are each prepared by sufficiently stirring the above-described components to form respective uniform mixtures. In the process of preparation, a mixture of a photopolymerization initiator and at least a part of polymerizable compounds may be subjected to ultrasonication and/or warming treatment. Consequently, in the prepared ink composition, the amount of dissolved oxygen is decreased to improve the discharge stability and the storage stability. Incidentally, in the following explanation, the first ink composition and the second ink composition may be collectively simply referred to as ink compositions.

The above-described mixture may be any mixture that contains a photopolymerization initiator and at least a part of polymerizable compounds. That is, the mixture may further contain a component other than the photopolymerization initiator and the part of polymerizable compounds or may contain all components of the ink composition.

2. Ink Jet Recording Apparatus

An ink jet recording apparatus relating to the ink jet method of the present embodiment described later will be described by exemplifying a serial-type ink jet printer with reference to FIG. 1. However, the scope of the present disclosure is not limited to the illustrated example. In addition, in FIG. 1, the scale of each member is different from the actual one so that each member is recognizable. Incidentally, in each drawing below, XYZ axes that are orthogonal to each other are attached.

2.1. Ink Jet Recording Apparatus

The ink jet printer 1 according to the present embodiment is a so-called serial-type printer. In the serial printer, an ink jet head is mounted on a carriage that moves in a predetermined direction, and the ink jet head moves as the carriage moves to perform printing. Hereinafter, the ink jet printer 1 is also simply referred to as a printer 1.

As shown in FIG. 1, the printer 1 includes an ink jet head 3, a carriage 4, a main scanning mechanism 5, a transport roller 6, a radiation source 11, a table device 30, and a control section (not shown) for controlling the operation of the entire printer 1. The ink jet head 3 and the radiation source 11 are arranged on the carriage 4 on the side facing the recording medium 2, and ink cartridges 7a, 7b, 7c, 7d, and 7e as containers for accommodating the inks to be supplied to the ink jet head 3 are detachable from the carriage 4.

The ink jet head 3 jets the ink compositions that are supplied from the ink cartridges 7a to 7e from nozzles (not shown) corresponding to the ink cartridges to adhere the ink compositions to a recording medium 2. As the form of the ink jet head 3, a known system can be used. In the present embodiment, a system of jetting a liquid by vibration of a piezoelectric element, i.e., a system of discharging ink composition droplets by mechanical deformation of a piezoelectric element, is used.

The main scanning mechanism 5 includes a timing belt 8 coupled to the carriage 4, a motor 9 for driving the timing belt 8, and a guide shaft 10. The guide shaft 10 lays as a supporting member for the carriage 4 in a direction along the Y axis that is the scanning direction of the carriage 4. The carriage 4 is driven by the motor 9 via the timing belt 8 and can reciprocate in a direction along the Y axis along the guide shaft 10. Consequently, the main scanning mechanism 5 reciprocates the carriage 4 in a direction along the Y axis. The direction along the Y axis is referred to as the main scanning direction in the printer 1.

The radiation source 11 is arranged side by side with the ink jet head 3 in the main scanning direction. The radiation source 11 includes a light emitter (not shown), such as a UV-LED (ultraviolet light-emitting diode). The radioactive rays emitted from the radiation source 11 are not limited to ultraviolet rays and may be, for example, infrared rays, electron rays, visible light rays, or X-rays. Here, as the radiation source 11, for example, a lamp may be used instead of the light emitter such as an LED (light-emitting diode) or an LD (semiconductor laser), but from the viewpoint of miniaturization and cost reduction, a light emitter may be used.

The transport roller 6 transports the recording medium 2 to which the ink composition adheres in a direction along the X axis that is orthogonal to the main scanning direction. Accordingly, the recording medium 2 is transported in a direction along the X axis which approximately corresponds to the length direction of the recording medium 2. The direction along the X axis is referred to as the sub-scanning direction in the printer 1.

As described above, the carriage 4 can reciprocate in the main scanning direction which approximately corresponds to the width direction of the recording medium 2. Consequently, the ink jet head 3 and the radiation source 11 can relatively scan the recording medium 2 in the main scanning direction and the sub-scanning direction. Incidentally, a plurality of transport rollers 6 may be provided. In the present embodiment, a transport roller 6 that transports a recording medium 2 before adhesion of the ink composition in the sub-scanning direction is provided.

The table device 30 mounts the recording medium 2 transported by the transport roller 6 on a platen section 21. The ink composition adheres to the recording medium 2 mounted on the platen section 21 by the ink jet head 3, and the recording medium 2 and the adhered first ink composition are cooled with a cooling device described later. The recording medium 2 after completion of adhesion of the ink composition is further transported in the sub-scanning direction by the transport roller 6.

The ink cartridges 7a, 7b, 7c, 7d, and 7e are independent five ink cartridges. The ink cartridges 7a, 7b, 7c, 7d, and 7e contain the first ink composition that adheres to the recording medium 2 in a first discharging step described later and the second ink composition that adheres to the recording medium 2 in a second discharging step described later.

For example, the ink cartridges 7a, 7b, 7c, and 7d can independently contain color inks having colors, such as black, cyan, magenta, and yellow, as the first ink composition, and the ink cartridge 7e can independently contain a clear ink as the second ink composition. Incidentally, in FIG. 1, the number of ink cartridges is five but is not limited thereto. For example, additional ink cartridges for containing color inks other than the above-mentioned color inks, such as a white ink and a light color ink, may be mounted.

The bottoms of the ink cartridges 7a, 7b, 7c, 7d, and 7e are provided with supply ports (not shown) for supplying the ink composition contained in each ink cartridge to the ink jet head 3.

As the member of the ink cartridges 7a to 7e, a formation material that is unlikely cause evaporation and deterioration of the ink components and is unlikely to be deteriorated by the ink components is used. In the present embodiment, ink cartridges are exemplified as the ink container, and the ink container is not limited thereto and may be an ink pack or ink bottle instead of the ink cartridge. In addition, the ink container need not be mounted on the carriage 4. The ink container may be disposed at a place other than the carriage 4, and the ink composition may be supplied to each nozzle of the ink jet head 3 through a supply pipe.

2.2. Cooling Device

The cooling device cools the recording medium 2 to which the first ink composition adheres. In the present embodiment, as the cooling device, a platen cooler 22 is provided inside the platen section 21. The recording medium 2 mounted on the platen section 21 is in contact with the platen section 21 and lowers the surface temperature of the recording medium 2 and the cured coating film of the first ink composition to a desired temperature or less.

As a cooling device other than the above-described platen cooler 22, a known device, such as a fan that generates cold air, can be used. Incidentally, the cooling device is not limited to devices that are attached to the printer 1. For example, the recording medium 2 may be cooled by lowering the temperature of the environment for installing the printer 1. In this case, for example, a method for cooling by leaving the first ink composition to stand in a state of adhering to the recording medium 2 may be used. Among these methods, the platen cooler 22 may be used from the viewpoint of being excellent in cooling efficiency because of the direct contact with the recording medium and not increasing the viscosity of the second ink composition at the time of discharging. The form of the platen cooler 22 may be a known one, such as a form that performs cooling with a refrigerant by disposing a tube inside the platen section or a form that performs cooling by using a chiller.

2.3. Recording Medium

The recording medium 2 is appropriately selected according to, for example, the purpose of use of the printed matter produced from the ink composition and the recording medium 2. The material for forming the recording medium 2 is not particularly limited, and examples thereof include plastics, such as polyvinyl chloride, polyethylene terephthalate (PET), polypropylene, polyethylene, polycarbonate, cellulose diacetate, cellulose triacetate, cellulose propionate, cellulose butyrate, cellulose acetate butyrate, cellulose nitrate, polyethylene terephthalate, polystyrene, and polyvinyl acetal, and these plastics whose surfaces are processed; non-absorptive recording media, such as glass and metals; low-absorptive recording media, such as coated paper; and high-absorptive recording media, such as paper and wood.

Among these media, when a printed matter is used in sign application, a non-absorptive recording medium, such as polycarbonate, may be used. The ink jet method of the present disclosure improves the glossiness and thereby can be suitably used in sign application.

3. Ink Jet Method

Figure 2:
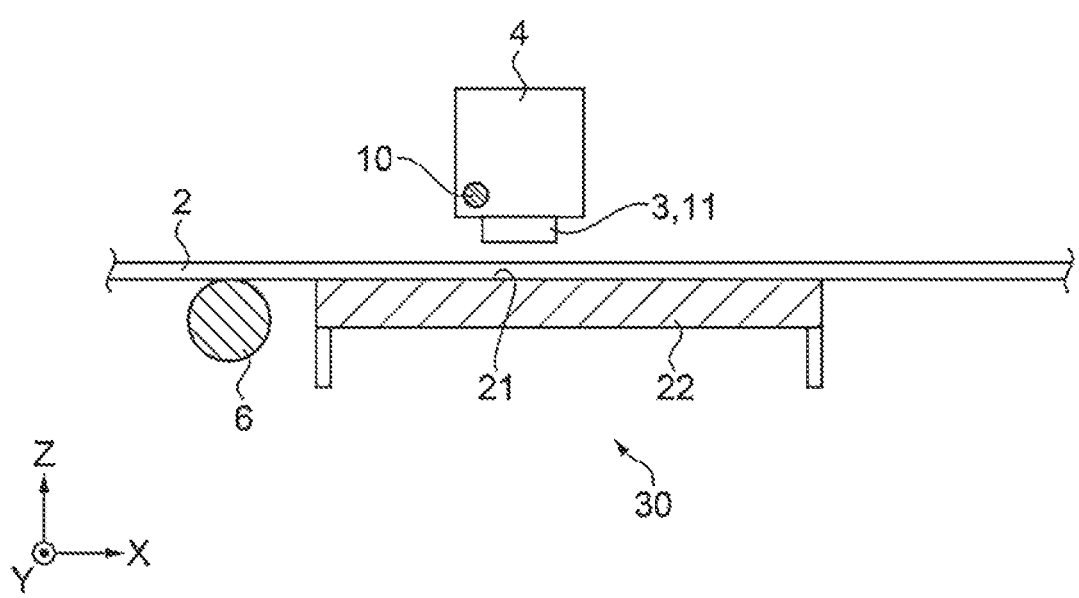
FIG. 2 is a cross-sectional schematic view illustrating the structure of a table device.

The ink jet method according to the present embodiment is characterized by including a first discharging step of discharging a first ink composition with an ink jet head 3 to adhere the composition to a recording medium 2, a first curing step of irradiating the first ink composition adhered to the recording medium 2 with radioactive rays, a cooling step of cooling the recording medium 2, a second discharging step of discharging a second ink composition with the ink jet head 3 to adhere the composition to the cooled recording medium 2 at least in a part of the region where the first ink composition adhered region, and a second curing step of irradiating the second ink composition adhered to the recording medium 2 with radioactive rays. Each step included in the ink jet method of the present embodiment will now be described with reference to FIGS. 1 and 2.

3.1. First Discharging Step

In the first discharging step, an first ink composition is discharged from an ink jet head 3 to adhere the composition to a recording medium 2. For details, a piezoelectric element is driven to discharge the first ink composition filling a pressure-generating chamber of the ink jet head 3 from a nozzle. This discharge method is also referred to as an ink jet method. On this occasion, multiple passes of repeating reciprocating movement of the carriage 4 multiple times in the main scanning direction with respect to a predetermined position of the recording medium 2 may be performed. That is, the transportation of the recording medium 2 in the sub-scanning direction is stopped for a certain period of time, the first ink composition is discharged by multiple passes, the recording medium 2 is then transported for a short distance, and multiple passes are implemented again.

The first ink composition is allowed to adhere to the recording medium 2, while moving the ink jet head 3 relative to the recording medium 2 to form a liquid layer of the first ink composition on the recording medium 2.

3.2. First Curing Step

In the first curing step, the liquid layer of the first ink composition adhered to the recording medium 2 is irradiated with radioactive rays from a radiation source 11 to cure the first ink composition on the recording medium 2 to form a cured coating film of the first ink composition. For details, radioactive rays from a radiation source 11 are directed toward the recording medium 2, while moving the carriage 4 relative to a predetermined position of the recording medium 2 in the main scanning direction. The movement of the carriage 4 in the main scanning direction may be once or may be repeated. The recording medium 2 may be irradiated with the radioactive rays at any region that includes the region to which the first ink composition adhered. The liquid layer of the first ink composition on the recording medium 2 is cured by irradiation with radioactive rays and becomes a cured coating film of the first ink composition. In particular, when the first ink composition is a color ink, the cured coating film is a desired image of a printed matter. Incidentally, the first discharging step and the first curing step may be repeated with respect to a specific position on the recording medium 2 or may not be repeated.

3.3. Cooling Step

In the cooling step, the recording medium 2 is cooled using a platen section 21. For details, after the first curing step is completed and before the second discharging step described later is started, a platen cooler 22 built-in the platen section 21 is operated by a control section (not shown) to cool the recording medium 2 being in contact with or close to the platen section 21. Consequently, the surface temperature of the recording medium 2 including the cured coating film of the first ink composition is lowered to a desired temperature or less. The cured coating film of the first ink composition is cooled via the recording medium 2 by providing the cooling step. Consequently, interaction between the cured coating film of the first ink composition and the second ink composition is unlikely to occur in the second discharging step and the second curing step described later. Accordingly, when the cured coating film of the second ink composition is formed, the glossiness of the cured coating film can be improved.

At the time of starting the second discharging step, the surface temperature of the recording medium 2 may be 15° C. or less, 10° C. or less, or 5° C. or less. According to this, interaction between the cured coating film of the first ink composition and the second ink composition is suppressed, and the glossiness of the printed matter can be further improved.

The timing of the cooling step is not limited to the above, as long as the surface temperature of the recording medium 2 is a desired temperature or less at the time of landing of the second ink composition on the recording medium 2 in the second discharging step described later. For example, if the surface temperature of the recording medium 2 is lowered to a desired temperature or less at the time of completion of the first curing step by performing the cooling step simultaneously with the first discharging step and the first curing step, the second discharging step may be started immediately after completion of the first curing step. In addition, the platen cooler 22 may be continuously operated in each step of the ink jet method or may be intermittently operated.

3.4. Second Discharging Step

In the second discharging step, the second ink composition is discharged from the ink jet head 3 and is allowed to adhere to the recording medium 2. On this occasion, the second ink composition may adhere to any region that includes the region where the cured coating film of the first ink composition has been formed on the recording medium 2. That is, the second ink composition need not adhere to the region where the cured coating film of the first ink composition has not been formed or may adhere solidly to substantially the entire surface of the recording medium 2 including the region where the cured coating film of the first ink composition has not been formed. Incidentally, as in the first ink composition in the first discharging step, the second discharging step may be performed by multiple passes or may be performed by a single pass. Consequently, a liquid layer of the second ink composition is formed at least on the cured coating film of the first ink composition.

In addition, in order to keep the surface temperature of the recording medium 2 to a predetermined temperature or less, the platen cooler 22 may be operated also after the start of the second discharging step to cool the recording medium 2.

The ink jet method may include, between the second discharging step and the second curing step described later, a leveling step of leaving the recording medium 2 to which the second ink composition adhered to stand for a predetermined time. When the leveling step is provided, the liquid layer of the second ink composition is flattened on the cured coating film of the first ink composition. Accordingly, after the liquid layer of the second ink composition has been flattened, the cured coating film of the second ink composition is formed from the liquid layer in the second curing step described later. Consequently, since the smoothness of the liquid layer of the second ink composition is enhanced, the glossiness of the cured coating film of the second ink composition is further improved.

The term "leaving to stand" here means that the recording medium 2 to which the second ink composition adhered in the second discharging step is not irradiated with radioactive rays in the second curing step. Accordingly, in the leveling step, for example, transportation of the recording medium 2 in the sub-scanning direction may be performed.

The standing time in the leveling step may be 1 second or more and 120 seconds or less, 2 seconds or more and 100 seconds or less, or 4 seconds or more and 80 seconds or less. According to this, since the liquid layer of the second ink composition is sufficiently flattened on the cured coating film of the first ink composition, the glossiness of the cured coating film of the second ink composition is further improved.

3.5. Second Curing Step

In the second curing step, the liquid layer of the second ink composition adhered to the recording medium 2 is irradiated with radioactive rays from the radiation source 11 to cure the second ink composition to form a cured coating film of the second ink composition. For details, the recording medium 2 is irradiated with radioactive rays from the radiation source 11, while moving the carriage 4 in the main scanning direction with respect to a predetermined position on the recording medium 2 including the cured coating film of the first ink composition. The movement of the carriage 4 in the main scanning direction may be once or may be repeated. The recording medium 2 may be irradiated with the radioactive rays at any region that includes the region to which the second ink composition adhered. The liquid layer of the second ink composition on the recording medium 2 is cured by irradiation with radioactive rays and becomes a cured coating film of the second ink composition. Incidentally, the process from the second discharging step to the second curing step may be repeated with respect to a specific position on the recording medium 2 or may not be repeated.

4. Example and Comparative Example

The effects of the present disclosure will now be more specifically described by Examples and Comparative Examples. Incidentally, the present disclosure is not limited to the following Examples.

4.1. Adjustment of Ink Composition

Table 1 shows the composition of each ink, the types of the polymerizable compounds used, the compound names, the glass transition temperature (Tg) of the homopolymer of each polymerizable compound, the proportion of each monofunctional monomer, and the weighted average value of Tg of each homopolymer. Here, the proportion of a monofunctional monomer is the content (unit: mass %) of the monofunctional monomer based on the total amount of the polymerizable compounds. The weighted average value of Tg of each homopolymer is the weighted average value (unit: ° C.) of the glass transition temperatures of homopolymers of the respective polymerizable compounds when the mass ratios of the contents of the respective polymerizable compounds contained in the ink composition are weighted. In Table 1, in the column of composition, the unit of each numerical value is mass %, and the column without a numerical value means that the polymerizable monomer is not contained. Each component is shown by its abbreviation. The abbreviations are described later.

Inks 1, 2, and 3 are color inks containing color materials. According to the compositions of inks 1, 2, and 3 shown in Table 1, a pigment as the color material, a dispersant, and a part of polymerizable compounds are weighed and are put in a tank for bead mill dispersion. Subsequently, ceramic beads of a diameter of 1 mm are put in the tank, and dispersion with a bead mill is performed to produce each pigment dispersion in which the pigment is dispersed in the polymerizable compounds.

Separately from each of the pigment dispersions above, the remaining polymerizable compounds, a photopolymerization initiator, a polymerization inhibitor, and a slipping agent, other than the components mixed in the pigment dispersion, are weighed and put in a stainless steel mixing tank. Subsequently, stirring using a mechanical stirrer is performed to completely dissolve the solid content, such as the photopolymerization initiator, in the polymerizable compounds. Subsequently, the pigment dispersion prepared above is weighed and added thereto, followed by further stirring in an environment of about 20° C. for 1 hour. Subsequently, filtration through a membrane filter of a pore size of 5 μm is performed to prepare each of inks 1 to 3.

Inks 4 and 5 are clear inks not containing a color material. According to the compositions of inks 4 and 5 shown in Table 1, polymerizable compounds, a photopolymerization initiator, a polymerization inhibitor, and a slipping agent are weighed and put in a stainless steel mixing tank. Subsequently, stirring using a mechanical stirrer is performed in an environment of about 20° C. for 1 hour to completely dissolve the solid content, such as the photopolymerization initiator, in the polymerizable compounds. Subsequently, filtration through a membrane filter of a pore size of 5 μm is performed to prepare each of inks 4 and 5.

TABLE 1

| | | | Tg [° C.] | Ink 1 | Ink 2 | Ink 3 | Ink 4 | Ink 5 |
|---|---|---|---|---|---|---|---|---|
| Polymerizable compound | Monofunctional monomer | TMCHA | 30 | | | 5.0 | | |
| | | DCPA | 110 | 36.8 | 17.0 | 14.3 | 47.3 | |
| | | IBXA | 94 | 14.0 | 20.3 | 24.0 | 24.0 | 36.3 |
| | | TBCHA | 10 | 18.0 | | | | 35.0 |
| | | LA | −23 | | 6.5 | | | |
| | | PEA | −22 | 5.0 | 10.0 | 10.0 | 5.0 | 5.0 |
| | | ACMO | 145 | 7.0 | 10.0 | 10.0 | 7.0 | 7.0 |

TABLE 1-continued

|  |  | Tg [° C.] | Ink 1 | Ink 2 | Ink 3 | Ink 4 | Ink 5 |
|---|---|---|---|---|---|---|---|
| Multifunctional monomer | VEEA | 39 | 5.0 | 20.0 | 5.0 | 5.0 | 5.0 |
|  | DPGDA | 104 | 3.0 | 5.0 | 3.0 | 3.0 | 3.0 |
| Photopolymerization initiator | IRGACURE 819 |  | 2.5 | 2.5 | 2.5 | 2.5 | 2.5 |
|  | IRGACURE TPO |  | 5.5 | 5.5 | 5.5 | 5.5 | 5.5 |
| Polymerization inhibitor | MEHQ |  | 0.2 | 0.2 | 0.2 | 0.2 | 0.2 |
| Slipping agent | BYK UV3500 |  | 0.5 | 0.5 | 0.5 | 0.5 | 0.5 |
| Color material (pigment) | PB 15:3 |  | 2.0 | 2.0 |  |  |  |
|  | PW 6 |  |  |  | 15.0 |  |  |
| Dispersant | solsperse 36000 |  | 0.5 | 0.5 | 5.0 |  |  |
| Total |  |  | 100.0 | 100.0 | 100.0 | 100.0 | 100.0 |
| Proportion of monofunctional monomer [mass %] |  |  | 91 | 72 | 89 | 91 | 91 |
| Weighted average value of Tg of each homopolymer [° C.] |  |  | 78 | 69 | 80 | 97 | 57 |

The details of the abbreviations used in Table 1 are as follows.

Monofunctional Monomer

TMCHA: 3,3,5-trimethylcyclohexyl acrylate, trade name: SR420, Sartomer Company Inc.

DCPA: dicyclopentenyl acrylate, trade name: FA-511AS, Hitachi Chemical Co., Ltd.

IBXA: isobonyl acrylate, Osaka Organic Chemical Industry Ltd.

TBCHA: tert-butylcyclohexanol acrylate, trade name: SR217, Sartomer Company Inc.

LA: lauryl acrylate, Tokyo Chemical Industry Co., Ltd.

PEA: phenoxyethyl acrylate, trade name: Viscoat #192, Osaka Organic Chemical Industry Ltd.

ACMO: acryloylmorpholine, KJ Chemicals Corporation.

Multifunctional Monomer

VEEA: 2-(2-vinyloxyethoxy)ethyl acrylate, vinyl ether group-containing (meth)acrylate represented by the formula (I), Nippon Shokubai Co., Ltd.

DPGDA: dipropylene glycol diacrylate, trade name: SR508, Sartomer Company Inc.

Photopolymerization Initiator

IRGACURE 819: trade name, bis(2,4,6-trimethylbenzoyl)-phenylphosphine oxide, BASF SE.

IRGACURE TPO: trade name, 2,4,6-trimethylbenzoyl diphenylphosphine oxide, BASF SE.

Polymerization Inhibitor

MEHQ: 4-methoxyphenol, Kanto Chemical Co., Inc.

Slipping Agent

BYK-UV3500: polyether-modified polydimethylsiloxane having an acryloyl group, BYK Additives & Instruments.

Pigment

PB 15:3: trade name, "C.I. Pigment Blue 15:3", Clariant Japan K.K.

PW 6: trade name, "C.I. Pigment White 6", titanium dioxide, TAYCA Corporation.

Dispersant

Solsperse 36000: trade name, polymer dispersant, The Lubrizol Corporation.

4.2. Production of Printed Matter for Evaluation

Then, printed matters for evaluation of Examples 1 to 7 and Comparative Examples 1 and 2 were produced by the ink jet method described above. For details, as shown in Table 2, inks 1, 2, and 3 as color inks and inks 4 and 5 as clear inks were used in combination. As the ink jet recording apparatus, an ink jet printer, PX-G930, of Seiko Epson Corporation was used indoors at an ambient temperature of 25° C. The printer was modified for using a polycarbonate base material as the recording medium 2, also modified for discharging a radiation-curable ink, and was attached with a platen section 21 having a built-in platen cooler 22 for cooling the recording medium 2. Hereinafter, Examples 1 to 7 are also collectively simply referred to as Examples, and Comparative Examples 1 and 2 are also collectively simply referred to as Comparative Examples.

TABLE 2

|  | Example 1 | Example 2 | Example 3 | Example 4 | Example 5 | Example 6 | Example 7 | Comparative Example 1 | Comparative Example 2 |
|---|---|---|---|---|---|---|---|---|---|
| First ink composition | 1 | 1 | 1 | 2 | 2 | 3 | 1 | 1 | 2 |
| Second ink composition | 4 | 4 | 5 | 4 | 5 | 1 | 4 | 5 | 5 |
| Recording medium surface temperature [° C.] | 15 | 10 | 15 | 5 | 15 | 15 | 20 | 30 | 30 |
| Glossy appearance | A | AA | A | AA | A | A | B | D | C |
| Scratch resistance | A | A | C | A | B | B | A | C | B |

First, a solid pattern was printed on a polycarbonate base material (IUPILON (registered trademark) NF2000, manufactured by Mitsubishi Gas Chemical Co., Ltd.) as the recording medium 2 using a color ink, ink 1, 2, or 3, as the first ink composition such that a cured coating film had a thickness (film thickness) of 10 μm. The solid pattern was then irradiated with ultraviolet rays as radioactive rays using a UV-LED as the radiation source 11 at an energy of 400 mJ/cm$^2$ to form a cured coating film of the first ink composition. Subsequently, in Examples 1 to 7, the platen cooler 22 disposed in the platen section 21 was operated, and the recording medium 2 and the cured coating film of the first ink composition were left to stand for 1 minute to lower the surface temperature to the temperature shown in Table 2. In Comparative Examples 1 and 2, the leaving to stand for 1 minute was performed without cooling, and it was confirmed that the surface temperature of the recording medium 2 and the cured coating film of the first ink composition was 30° C. due to the radiation heat and so on by the irradiation of UV-LED. The surface temperature of the recording medium 2 was measured using a radiation thermometer IT-550L of HORIBA.

Subsequently, a solid pattern having a thickness of 10 μm was printed on the cured coating film of the first ink composition using a color ink, ink 1, or a clear ink, ink 4 or 5, as the second ink composition. The solid pattern was then irradiated with ultraviolet rays as radioactive rays using the UV-LED at an energy of 400 mJ/cm$^2$ to form a cured coating film of the second ink composition. By the above process, printed matters for evaluation of Examples 1 to 7 were produced.

4.3. Evaluation

Each printed matter of Examples and Comparative Examples was subjected to the following evaluation, and the results of evaluation are shown in Table 2.

4.3.1. Glossiness of Printed Matter

When each printed matter was visually observed under a fluorescent light, the distance between the fluorescent light and the cured coating film allowing recognition of the reflection of the fluorescent light was measured. From the distance, glossiness was evaluated according to the following evaluation criteria.

Evaluation Criteria

AA: reflection of fluorescent light can be observed from a distance of 50 cm or more, A: reflection of fluorescent light can be observed from a distance of 30 cm or more and less than 50 cm, B: reflection of fluorescent light can be observed from a distance of 10 cm or more and less than 30 cm, C: reflection of fluorescent light can be observed from a distance of less than 10 cm, and D: reflection of fluorescent light cannot be observed.

4.3.2. Scratch Resistance of Cured Coating Film of Second Ink Composition

Each printed matter was subjected to a micro-scratch test according to JIS R3255 as an index of scratch resistance. Specifically, the cured coating film was scratched using a nano-layer scratch tester, CSR-5000, of Nanotec Corporation while changing the load applied to a probe, and the load when the probe pierced through the cured coating film of the second ink composition to expose the cured coating film of the first ink composition was measured. Here, the load applied to the probe when the probe reached the cured coating film of the first ink composition is also referred to as a withstand load. The measurement conditions were a probe stylus diameter of 15 μm, an amplitude of 100 μm, and a scratching rate of 10 μm/sec. From the measured withstand load, scratch resistance was evaluated according to the following evaluation criteria. Incidentally, a larger withstand load means a higher scratch resistance.

Evaluation Criteria

A: the withstand load is 25 mN/cm$^2$ or more,

B: the withstand load is 20 mN/cm$^2$ or more and less than 25 mN/cm$^2$, and

C: the withstand load is less than 20 mN/cm$^2$.

4.3.3. Conclusion of Evaluation Results

As shown in Table 2, in the evaluation of glossiness, the evaluation was C or lower in Comparative Examples 1 and 2 in which the recording medium 2 was not cooled. In contrast, in each Example in which the recording medium 2 was cooled, the evaluation of the glossiness of the printed matter was B or higher. Here, evaluation D, evaluation C, and evaluation B correspond to "unacceptable", "acceptable", and "good", respectively.

In Example 7 in which the cooling temperature of the recording medium 2 was 20° C., the evaluation of the glossiness of the printed matter was B. In contrast, in Examples 1, 3, 5, and 6 in which the cooling temperature of recording medium 2 was 15° C., the evaluation was A which corresponds to "very good", and in Examples 2 and 4 in which the cooling temperature of the recording medium 2 was 10° C. or less, the evaluation was "AA" which corresponds to "excellent". It was therefore demonstrated that the glossiness was improved by reducing the temperature of the recording medium 2 in the cooling step. It was also demonstrated that a lower temperature of the recording medium 2 provides a printed matter having more excellent glossiness.

In the evaluation of scratch resistance, the evaluation was B or lower in Examples 3, 5, and 6 and Comparative Examples 1 and 2 in which ink 1 or ink 5 was used as the second ink composition. In contrast, in Examples 1, 2, 4, and 7 in which the second ink composition was ink 4 containing a large amount of a polymerizable compound the homopolymer of which has a relatively high glass transition temperature (Tg), such as a nitrogen-containing monofunctional monomer, the evaluation was A. Here, evaluation C, evaluation B, and evaluation A correspond to "unacceptable", "acceptable", and "good", respectively. It was therefore demonstrated that when an ink containing a large amount of a polymerizable compound the homopolymer of which has a high glass transition temperature (Tg) is used as the second ink composition, the cured coating film of the first ink composition can be suitably protected by the cured coating film of the second ink composition.

According to the present embodiment, the following effects can be obtained.

When a cured coating film of the second ink composition is formed on a cured coating film of the first ink composition, the glossiness of the printed matter can be improved. For details, interaction between the cured coating film of the first ink composition and the second ink composition is unlikely to occur by cooling the cured coating film of the first ink composition via the recording medium 2 in the cooling step. Accordingly, when a cured coating film of the second ink composition is formed, the glossiness of the cured coating film can be improved.

Furthermore, when the ink jet method is implemented in an environment higher than 15° C. by that the surface temperature of the recording medium 2 is 15° C. or less at the time of starting the second discharging step, the recording medium is cooled to the ambient temperature or less. Accordingly, the glossiness of the printed matter can be further improved.

The recording medium 2 is directly cooled by using a platen cooler 2 as the cooling device for performing the cooling step. Accordingly, compared to the case of cooling the circumference of the ink jet head 3 with cold air or the like, the cooling efficiency of the recording medium 2 is excellent, and the viscosity of the ink composition at the time of discharge is not increased.

The glossiness of the printed matter can be obtained while suitably protecting the image formed by the cured coating film of the first ink composition by that the second ink composition is a clear ink.

The extensibility of the cured coating film of the first ink composition is improved by that the content of the monofunctional monomer contained in the first ink composition is 80 mass % or more based on the total amount of the polymerizable compounds contained in the first ink composition. In addition, when the content of the monofunctional monomer contained in the first ink composition is 80 mass % or more, since the glossiness tends to decrease in known ink compositions, the present disclosure is particularly effective.

The scratch resistance of the cured coating film of the second ink composition is improved by that the second ink composition contains a nitrogen-containing monofunctional monomer as a polymerizable compound.

The curability of the second ink composition can be improved by that the second ink composition contains a vinyl ether group-containing (meth)acrylate represented by the formula (I) as a polymerizable compound. In particular, since the present disclosure includes a cooling step, the viscosity of the second ink composition in the second discharging step is easily increased. However, the viscosity of the second ink composition can be relatively low by using the vinyl ether group-containing (meth)acrylate of the formula (I).

Since the glossiness of the printed matter is improved by using a non-absorptive recording medium, such as polycarbonate, as the recording medium 2, the present disclosure can be suitably used in sign application.

A printed matter having excellent glossiness can be produced by using the ink jet recording apparatus that performs recording of the present embodiment.

What is claimed is:

1. An ink jet method for recording a radiation-curable ink composition containing a polymerizable compound, where
    the radiation-curable ink composition comprises a first ink composition and a second ink composition,
    the ink jet method comprising:
    a first discharging step of discharging the first ink composition with an ink jet head to adhere the first ink composition to a recording medium;
    a first curing step of irradiating the first ink composition adhered to the recording medium with radioactive rays;
    a cooling step of cooling the recording medium;
    a second discharging step of discharging the second ink composition with an ink jet head to adhere the second ink composition to the cooled recording medium at least in a part of a region where the first ink composition adhered; and
    a second curing step of irradiating the second ink composition adhered to the recording medium with radioactive rays.

2. The ink jet method according to claim 1, wherein the recording medium has a surface temperature of 15° C. or less at the time of starting the second discharging step.

3. The ink jet method according to claim 1, wherein
    the cooling step is performed by a cooling device; and
    the cooling device is a platen cooler.

4. The ink jet method according to claim 1, wherein the second ink composition is a clear ink.

5. The ink jet method according to claim 1, wherein
    the first ink composition contains 80 mass % or more of a monofunctional monomer based on the total amount of the polymerizable compound.

6. The ink jet method according to claim 1, wherein
    the second ink composition contains a nitrogen-containing monofunctional monomer as the polymerizable compound.

7. The ink jet method according to claim 1, wherein
    the second ink composition contains a vinyl ether group-containing (meth)acrylate represented by a following formula (I) as the polymerizable compound, $$H_2C=CR^1-CO-OR^2-O-CH=CH-R^3 \quad (I)$$

(where, $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms).

8. The ink jet method according to claim 1, wherein
    the recording medium is a non-absorptive recording medium.

9. An ink jet recording apparatus comprising:
    an ink jet head; and
    a radiation source, wherein
    the apparatus performs the ink jet method according to claim 1.

* * * * *